Aug. 16, 1966  H. EDELMAN  3,266,760

ELECTRIC CORD TAKEUP APPARATUS

Filed June 1, 1964

INVENTOR.
HELEN EDELMAN
BY Allen E. Botney
ATTORNEY

United States Patent Office 3,266,760
Patented August 16, 1966

3,266,760
ELECTRIC CORD TAKEUP APPARATUS
Helen Edelman, North Hollywood, Calif., assignor to Kordaway Company, Inc., Los Angeles, Calif.
Filed June 1, 1964, Ser. No. 371,706
1 Claim. (Cl. 248—51)

The present invention relates in general to electric irons of the kind used to iron clothes and other fabrics and more particularly relates to a device for controlling and adjusting the position of the electric cord associated with such appliances.

As is well known, the modern-day iron is electrically operated and, therefore, requires that a flexible electric cord be used to interconnect the iron with a proximate source of electrical power. Basically, the cord comprises a pair of flexible wires that are respectively connected at one end to the prongs of a male plug and at the other end to the terminals of the electrical network contained in the iron, the wires respectively being insulated to electrically isolate them from each other and then enclosed in a material that not only protects them further but also holds them together. However, while the above said cord is an essential item in the use of an item, it is, nevertheless, oftentimes a nuisance in that it frequently gets in the way of the user, that is to say, it interferes with the ironing routine. Thus, a certain amount of inconvenience is always suffered and time lost by having to constantly move the cord out of the way. Furthermore, and most importantly, the electric cord comes into contact with the hot iron from time to time, with the result that, as time passes, the outer protective material becomes either charred or burnt through as well as the insulation beneath it. This, in turn, leads to what is now a common experience, namely, the blemishing of the clothes or other fabrics being ironed by the charred or burnt areas coming into contact with them. Accordingly, there has been a long-felt need for an inexpensive device that would prevent this from happening.

It is, therefore, an object of the present invention to provide a device for use in connection with electric iron cords to prevent the cords from snarling or twisting.

It is another object of the present invention to provide a device for use in connection with electric iron cords that would prevent the cord from coming into contact with the hot iron.

It is a further object of the present invention to provide a device for use in connection with electric iron cords that would automatically take up the slack in such cords.

The above-stated objects are achieved or realized and, therefore, the problems encountered with the use of electric irons obviated, by means of the present invention which provides a device that at all times permits only a minimum length of cord over the ironing board or table and, in addiiton, keeps this length of cord out of the way, that is to say, it keeps it from the iron as well as from the material being ironed. More particularly, according to a preferred embodiment of the invention, a helical expansion spring that permits the wall plug and electrical plug to pass freely therethrough from end to end is mounted on a support member that is adapted to clampingly engage a base, such as the ironing board or table. Swivably mounted on said support member and integral with one end of the helical spring is a ring whose function it is not only to affix one end of the spring to the support member but also to freely allow proper orientation of the spring as the position of the iron changes. The device further includes an element on the other end of the helical spring that is used to affix said other end to the electrical cord. As a result, the spring expands and contracts as the cord length over the work area respectively increases and decreases but, because of its spring action, always keeps this length at a minimum.

The novel features which are believed to be characteristic of the invention, both as to its organizaiton and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 1:
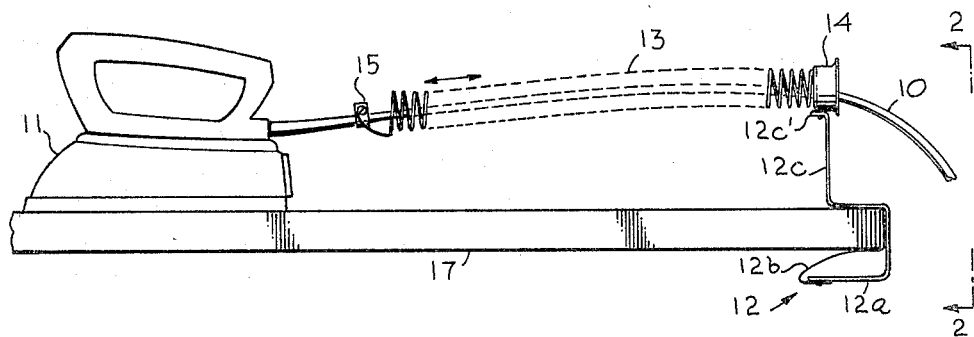
FIGURE 1 is a side view of a preferred embodiment of the invention and illustrates the manner in which it is used.

Considering now the features of the invention in detail, reference is made to the drawing wherein like or similar parts or elements are similarly designated. More particularly, in FIG. 1, a device according to the present invention is shown in cooperative relationship with an electric cord 10 of the kind customarily used in connection with electric appliances, such as the electric iron designated 11 in the figure. As is normally the case, cord 10 is connected at one end to the iron and at the other end to a male plug (not shown) which, in turn, is inserted in an electrical outlet.

The device itself includes a support member, generally designated 12, made up of a U-shaped element 12a, a spring element 12b, and a rod-like or stem-like element 12c, all of which lie in the same plane. At one end, element 12c is integral with and extends perpendicularly from one of the sides of U-shaped element 12a while at its other end it is bent at a right angle to form a flange 12c'. Spring element 12b is a resilient strip and, therefore, is of the leaf-spring type. It is connected to the other side of U-shaped element 12a and curves inward toward its base.

The device further includes a tubular-shaped elastic spring 13 that is firmly connected, at one end, to a ring-shaped member 14 whose diameter is substantially the same as that for the elastic spring, the diameters of both being large enough to permit electric cord 10 and its male plug to be pulled through. At the other end of the spring it is connected or linked to a clamp element 15 which, as its name implies, is used to clamp that end of elastic spring 13 to electric cord 10. The details of this particular clamp element are shown more clearly in FIG. 2. Ring 14 is swivably mounted on flange 12c' by means of a swivel joint that is also more clearly shown in FIGS. 2 and 3 wherein it is designated 16. At this point, therefore, suffice it to say that ring 14 is enabled because of the swivel joint to rotate 360°, thereby permitting elastic spring 13 to freely change direction as the position of iron 11 changes.

Figure 2:
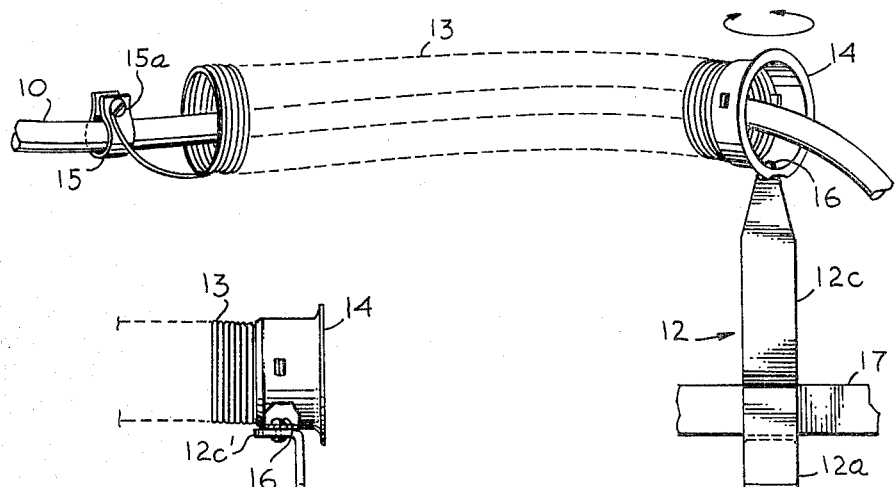
FIGURE 2 is another view of the same embodiment taken along and in the direction of arrows 2—2 in FIG. 1.

Reference is now made to FIG. 2 wherein the construction and clamping action of element 15 is more clearly shown. As shown therein, it consists of a band or strip of material wound around cord 10 so that the ends of the strip face each other. A screw 15a passes through both these ends and is secured with a nut (not shown because of the angle of the clamp) so that cord 10 is firmly held between the screw and the strip. As was previously stated, clamp 15 is connected or linked with an end of elastic spring 13 and, as is also shown in the figure, this is accomplished by coiling the tip of the last turn of spring wire around the head of the screw.

It should additionally be mentioned that clamp strip 15 may, for sake of convenience, have a hole through each of its ends through which screw 15a will pass for its clamping action.

Figure 3:
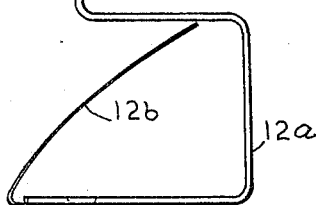
FIGURE 3 is a view, partly in cross-section, of a portion of the embodiment and illustrates how one member is mounted on another.

In connection with swivel joint 16, reference is made to FIG. 3, wherein ring 14 and flange 12c' shown in surface-to-surface contact, holes being drilled through these contacting surfaces and a rivet-type element passed through the holes to loosely hold or mount the ring on the flange. It is in this way that ring 14 and, therefore, spring 13 is permitted to swing through a complete circle if necessary. The ability of the ring to turn on its joint is illustrated in FIG. 2 wherein ring 14 and support 12 are shown pointing in different directions although they are pointing in the same direction in FIG. 1.

In using and operating the device, cord 10 is first completely passed through both tubular spring 13 and ring 14. The cord is then attached to spring 13 by means of clamp 15 and in the manner previously described, the point of attachment preferably being close to iron 11 as is illustrated in the FIG. 1. When this is done, the device is mounted on the ironing board or table, designated 17, this being achieved by inserting the edge of the board or table between the two sides of U-shaped support element 12a. Any slack that might normally exist between the board or table and the sides of element 12a is taken up by spring 12b, thereby assuring a relatively rigid mounting of the device. The iron may now be used in a normal manner and when so used, spring 13 will stretch or contract as the iron is respectively moved forward and backward, the slack that might normally develop in the cord at all times being taken up by the spring, thereby at all times preventing the cord from coming into contact with the hot iron or otherwise becoming snarled or caught in the clothes or other fabrics being ironed.

Although a particular arrangement of the invention has been illustrated above by way of example, it is not intended that the invention be limited thereto. Accordingly, the invention should be considered to include any and all modifications, alterations, or equivalent arrangements falling within the scope of the annexed claim.

Having thus described the invention, what is claimed is:

Electric cord keeper apparatus adapted to be applied to a cord fixedly connected to an electric iron at one end and having a wall plug at the other end, said apparatus comprising: a bracket adapted to clampingly engage the side of an ironing board and to support an electric cord above it, said bracket including a generally U-shaped structure and a rigid bar integral with and extending perpendicularly from one side of said U-shaped structure, said structure including a leaf-spring in the form of a resilient strip of material that is affixed at one end thereof to the other side of said U-shaped structure and extends inwardly at an angle toward the base thereof; a ring member swivably mounted on the free end of said bar, the opening through the center of the ring being large enough to permit both the cord and the plug to pass freely therethrough; a helical spring having a large enough opening therethrough to permit both the cord and the plug to pass freely therethrough, said spring being connected at one end to said ring; and a clamp device mounted on the other end of said helical spring for connecting said other end directly to the cord.

References Cited by the Examiner

UNITED STATES PATENTS

| | | | |
|---|---|---|---|
| 1,812,518 | 6/1931 | Druppel | 248—51 |
| 1,943,134 | 1/1934 | McKesson | 248—51 |
| 2,034,510 | 3/1936 | Esch | 248—51 |

CLAUDE A. LE ROY, *Primary Examiner.*

K. J. WINGERT, *Assistant Examiner.*